United States Patent
Hogan

(10) Patent No.: US 11,766,023 B2
(45) Date of Patent: Sep. 26, 2023

(54) LIVESTOCK FEED TANK WITH MODULAR UNLOADER

(71) Applicant: The GSI Group LLC, Assumption, IL (US)

(72) Inventor: Alan C. Hogan, Assumption, IL (US)

(73) Assignee: The GSI Group LLC, Assumption, IL (US)

( * ) Notice: Subject to any disclaimer, the term of this patent is extended or adjusted under 35 U.S.C. 154(b) by 302 days.

(21) Appl. No.: 17/116,268

(22) Filed: Dec. 9, 2020

(65) Prior Publication Data

US 2021/0169040 A1    Jun. 10, 2021

Related U.S. Application Data

(60) Provisional application No. 62/945,320, filed on Dec. 9, 2019.

(51) Int. Cl.
| | |
|---|---|
| *B65G 33/18* | (2006.01) |
| *A01K 5/00* | (2006.01) |
| *B65G 65/02* | (2006.01) |
| *B65G 33/32* | (2006.01) |
| *B65G 65/46* | (2006.01) |

(52) U.S. Cl.
CPC ............... *A01K 5/00* (2013.01); *B65G 33/18* (2013.01); *B65G 33/32* (2013.01); *B65G 65/02* (2013.01); *B65G 65/46* (2013.01)

(58) Field of Classification Search
CPC .................................................. B65G 33/18
See application file for complete search history.

(56) References Cited

U.S. PATENT DOCUMENTS

| | | | |
|---|---|---|---|
| 4,016,970 A | 4/1977 | Wert | |
| 4,030,452 A | 6/1977 | Keen et al. | |
| 4,223,638 A | 9/1980 | Sappington et al. | |
| 5,697,327 A * | 12/1997 | Pollock | A01K 5/0258 119/57.4 |
| 6,067,933 A | 5/2000 | Cason | |
| 8,820,181 B2 * | 9/2014 | Bowsher | G01N 1/00 73/863 |
| 10,670,338 B2 * | 6/2020 | Wingard, Jr. | F26B 9/063 |
| 11,167,931 B1 * | 11/2021 | Williams | F16C 17/10 |

(Continued)

OTHER PUBLICATIONS

UK Intellectual Property Office, Search Report for related UK Application No. GB2000408.1, dated Jul. 10, 2020.

*Primary Examiner* — Joseph A Dillon, Jr.

(57) ABSTRACT

A bulk feed tank has a boot unloader through which feed is directed into a supply system having at least one conveyor housing an auger. The boot unloader includes an unloader body formed of front, rear and opposing side panels forming a rectangular receiving portion. An auger mounting plate is mounted to the front panel and mates with the conveyor. A bearing assembly is secured to the rear panel and rotatably mounts the auger such that the auger passes through the receiving portion. A clear access door is attached to at least one of the opposing side panels. A wear plate assembly is attached to an. The wear plate assembly is fastened to the front, rear and side panels under the boot unloader body and can be removed without unfastening the side panels from the front panel and the rear panel or removing the auger from the receiving portion.

4 Claims, 5 Drawing Sheets

(56) References Cited

U.S. PATENT DOCUMENTS

| | | | |
|---|---|---|---|
| 2003/0188956 A1* | 10/2003 | Lepage | B65G 33/18 |
| | | | 198/550.1 |
| 2012/0269028 A1 | 10/2012 | Gordon | |
| 2012/0321421 A1* | 12/2012 | Lavoie | B65G 33/22 |
| | | | 414/812 |
| 2013/0028694 A1 | 1/2013 | Van Mill et al. | |
| 2013/0199450 A1 | 8/2013 | Harty, Sr. et al. | |
| 2014/0261199 A1 | 9/2014 | Rose et al. | |
| 2017/0089009 A1* | 3/2017 | Mellander | B65G 33/18 |
| 2021/0127630 A1* | 5/2021 | Zimmerman | A61B 5/1118 |
| 2022/0194720 A1* | 6/2022 | DeWind | B65G 33/34 |

\* cited by examiner

LIVESTOCK FEED TANK WITH MODULAR UNLOADER

CROSS REFERENCE TO RELATED APPLICATION

This application claims the benefit of U.S. Provisional Application No. 62/945,320, filed Dec. 9, 2019, which is hereby incorporated by reference in its entirety.

BACKGROUND OF THE INVENTION

Field of Invention

This invention relates to livestock feed storage systems, and more particularly to a device that maintains the flow of feed, or similar substances, from a bulk storage tank downwardly through an attached boot and unloader for delivery to an auger system that transports the feed to a feed dispenser.

Description of Related Art

Livestock feed systems allow for storage of livestock feed in a central storage tank or bin. From the storage tank, a feed supply system 24 having one or more conveyor tubes in which an auger is driven is used to convey the feed along a feed path to where it is presented to the animals such as by drop tubes to feeders located within the livestock building. Augers can provide consistent and steady delivery of feed to livestock in a plurality of locations across a barn or other livestock facility. The feed is fed by gravity from the feed bin into the auger through a boot unloader located under the feed tank.

Livestock facilities have different requirements for the desired configuration of the feed supply system. Sometimes it is desired to have more than one feed line leading from the bulk tank to the livestock buildings. Typically, it is necessary to provide a different boot unloader in order to change the number of feed lines serviced by the boot unloader.

Another disadvantage of prior boot unloaders is the wear and tear on components of the boot unloader caused by rotation of the auger. Periodically, it is necessary to replace components that have surfaces exposed to wear. Typically, this has required the disassembly of the boot unloader and removal of the auger.

Accordingly, a need exists for a boot unloader with a modular configuration to make so that the unloader can be used for feed systems requiring different auger configurations, one that permits observation of the operation of the boot unloader, and also allows for manual cleaning and replacement of wear parts.

OVERVIEW OF THE INVENTION

In one embodiment, the invention is directed to a bulk feed tank for use in storing and distributing feed grain. The bulk feed tank has a lower outlet section having an outlet boot through which the feed grain is directed into a feed supply system having at least one conveyor housing an auger. The feed supply system includes a boot unloader coupled to an upstream end of the conveyor tube and has an upwardly opening aperture that is matingly positioned in fluid communication with a downwardly opening aperture of the outlet boot. The boot unloader includes an unloader body formed of a front panel, a rear panel and opposing side panels. Each of the side panels is fastened to the front panel and to the rear panel such that the front panel, rear panel and side panels are joined together to form a generally rectangular receiving portion in which feed grain flows from the outlet boot. At least one auger mounting plate is mounted to the front panel and has a tube interface for mating with the conveyor. A bearing assembly is secured to the rear panel. The bearing assembly has a bearing housing and at least one end bearing that rotatably mounts the auger such that the auger passes through the receiving portion. An access door is attached to at least one of the opposing side panels. The access door is made of a clear plastic material to permit observation into the receiving portion of the unloader body while the auger is rotating. A wear plate assembly is attached to an underside of the boot unloader body. The wear plate assembly is fastened to the front, rear and side panels and can be removed from the boot unloader body without unfastening the side panels from the front panel and the rear panel or removing the auger from the receiving portion.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
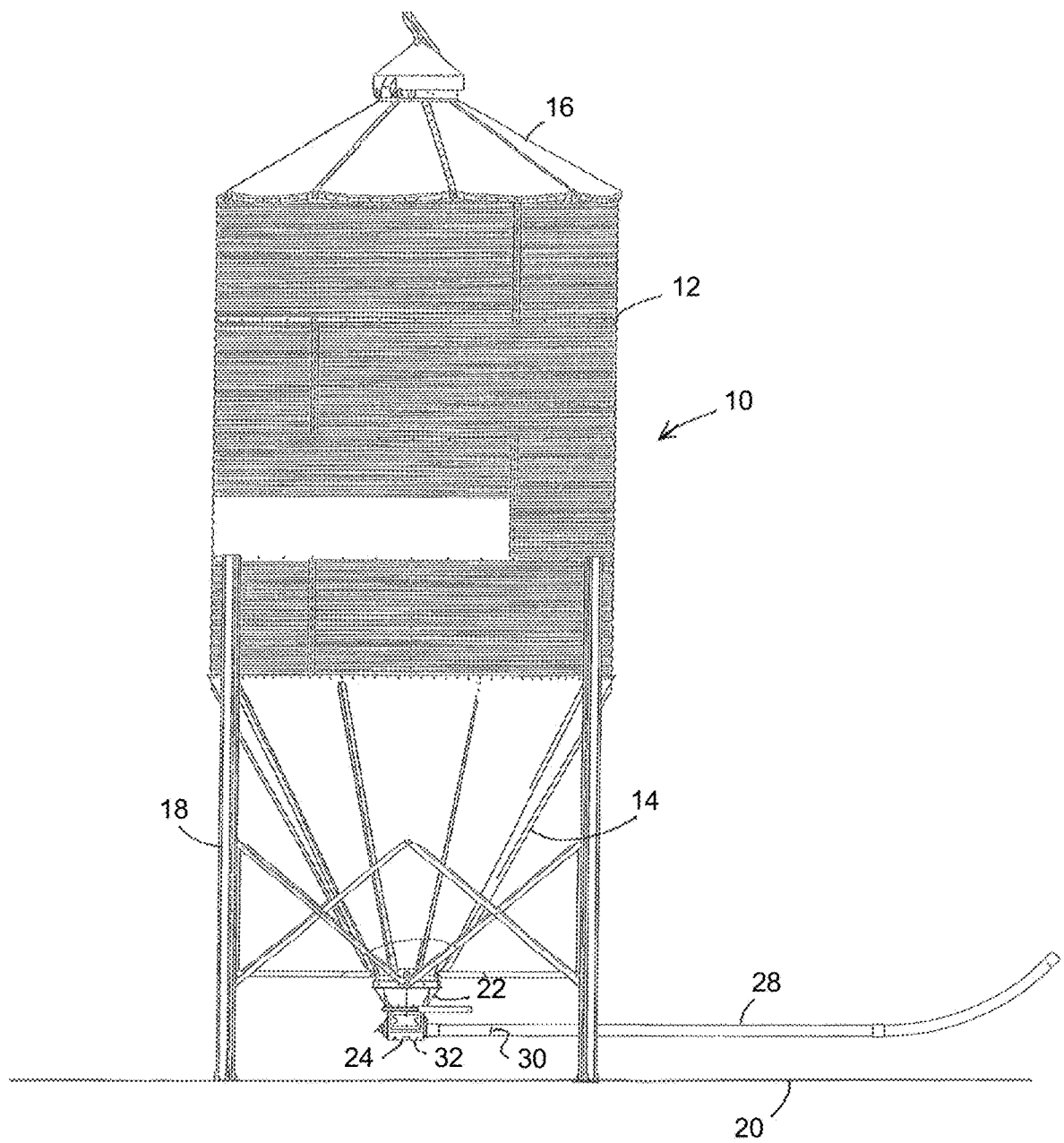
FIG. 1 is a schematic view of bulk feed tank with a feed supply system having a boot unloader according to an embodiment of the invention.
Figure 2:
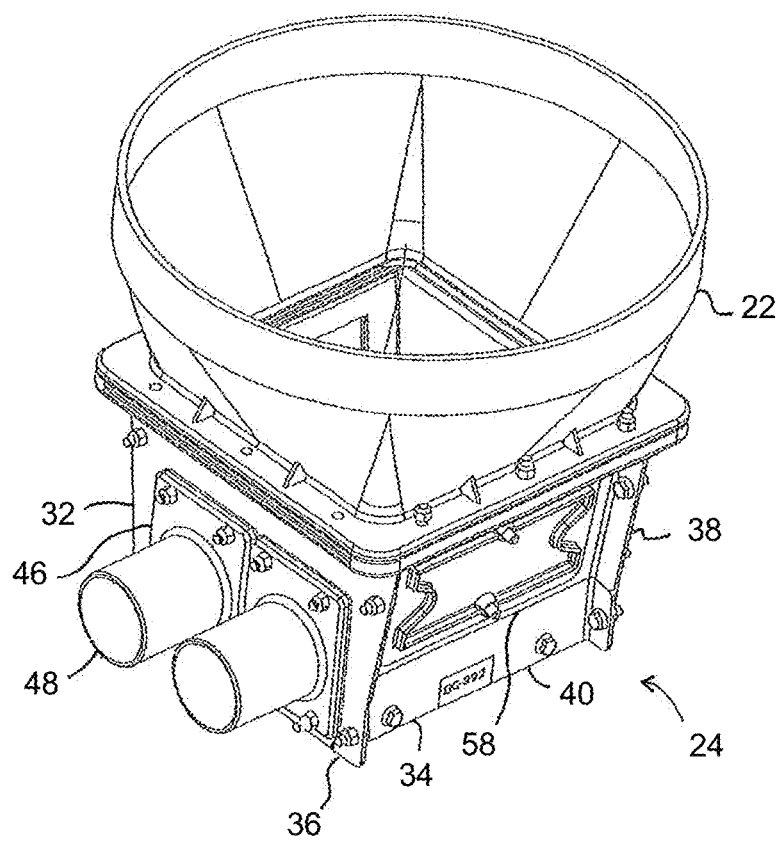
FIG. 2 is a perspective view of the boot unloader of FIG. 1.
Figure 3:
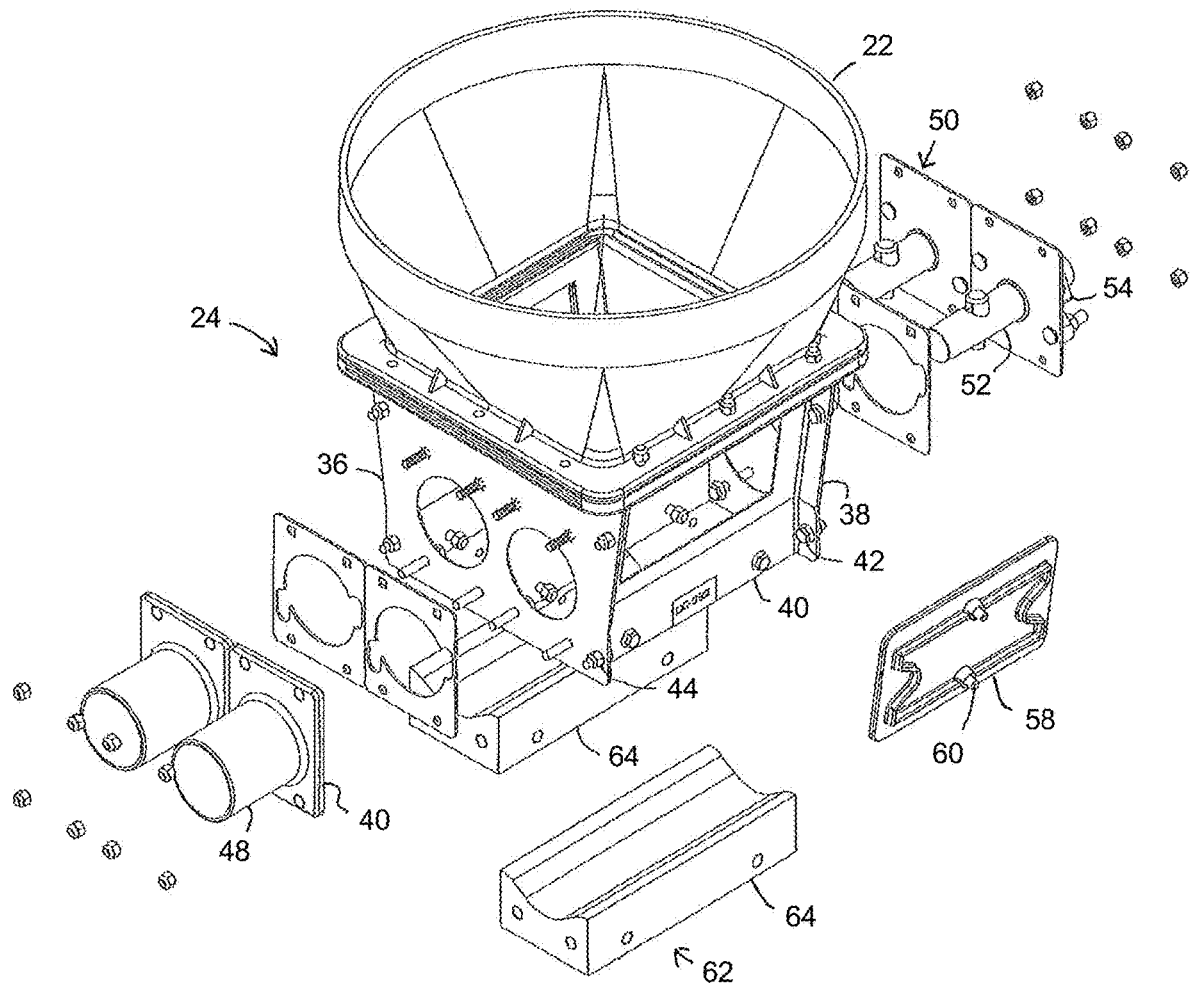
FIG. 3 is an exploded view of the boot unloader of FIG. 2.
Figure 4:
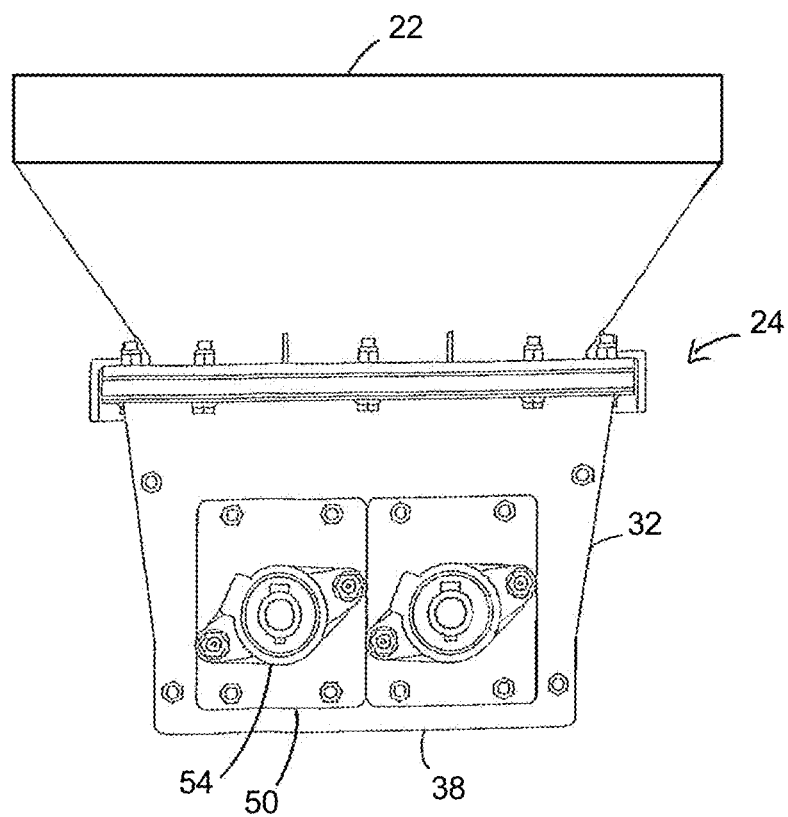
FIG. 4 is a rear end view of the boot unloader of FIG. 2.

Referring to FIG. 1, a bulk feed tank 10 such as one that would be located proximate a livestock building (not shown) in which a feeding system is installed. The livestock building and feeding system may be of any design and would be known to one skilled in the art and need not be discussed herein. Typically, such bulk feed tanks 10 (or other storage silos or bins) are used in conjunction with feeding systems to store large quantities of feed grain for distribution to one or more feeders from which livestock eat the feed grain. As shown, the bulk feed tank 10 has a cylindrical upper portion 12 that is disposed above a generally frusto-conical lower outlet section 14. A conical roof 16 prevents moisture and rain from entering the interior of the bulk feed bin 10. Legs 18 that are anchored into a concrete pad 20 support the bulk feed bin 10 above the ground.

At the bottom end of the outlet section 14, an outlet boot 22 is provided for directing feed from within the bulk feed tank 10 into a feed supply feed supply system 24. The feed supply feed supply system 24 has a conveyor tube 28 in which an auger 30 is driven. The boot 22 is disposed below the lower outlet section 14 and includes a downwardly opening aperture, out of which feed grain stored within the interior of the bulk feed bin 10 can flow under the influence of gravity.

The feed supply system 24 includes a boot unloader 32 having an upwardly opening aperture that is matingly positioned in fluid communication with the downwardly opening aperture of the boot 22 of the bulk feed bin 10. The boot unloader 32 is coupled to an upstream end of the conveyor tube 28 of the feed supply system 24. As is known in the art, the feed supply system 24 may supply feed grain by means of drop tubes to feeders (not shown) located within the livestock building. Rotation of the auger 30 within conveyor tube 28 moves grain longitudinally within the conveyor tube 28 from the boot unloader 32 and into feeder out of which the animals can eat the feed.

Turning also now to FIGS. 2-5, the boot unloader 32 is illustrated according to one embodiment of the invention. The boot unloader 32 has an unloader body 34 formed of a front panel 36, a rear panel 38 and opposing side panels 40 joined together to form a generally rectangular receiving portion in which grain flows from the outlet boot 22. The front, rear and side panels 36, 38, 40 are bolted together with suitable bolts 42 and nuts 44, or joined together in any other manner using sound engineering judgement. The front panel 36 receives at least one auger mounting plate 46 having a tube interface 48 for mating with the conveyor tube 28. In the illustrated embodiment, the front panel 36 has two auger mounting plates 46 such that the feed supply feed supply system 24 includes two feed paths with two conveyor tubes 28 and two augers 30. However, the boot unloader 32 has a modular design such that the front panel 36 can be configured such that it receives one, two, three, four or possibly even more auger mounting plates 46 as required for the requirements of the feed supply feed supply system 24.

A bearing assembly 50 secures the auger 30 in the conveyor tube 28 and include a bearing housing 52 and an end bearing 54. The bearing assembly 50 is configured to be secured to the rear panel 38 of the boot unloader 32. The end bearing 54 is configured to mate with the bearing housing 52 and is able to rotate freely with respect to the bearing housing 52. In the illustrated embodiment, two parallel feed paths extend through the boot unloader 32, each terminating at respective end bearings 54 at one end of the boot unloader 32. However, as described above, the boot unloader 32 has a modular design such that the bearing assembly 50 at the rear panel 38 can be configured such that it receives, one, two, three, four or possibly even more end bearings 54 as required for the number of augers 30 in the feed supply feed supply system 24.

The side panel 40 of the boot unloader 32 in this embodiment also includes an access door 58 that is held in place by a pair of fasteners 60. Desirably, the access door 58 is made of a clear plastic material to permit observation of the operation of the boot unloader 32 and also allowing for manual cleaning, unclogging, and repair of the boot unloader 32.

The underside of the boot unloader is formed with a wear plate assembly 62 fastened to the front, rear and side panels 36, 38, 40 of the unloader body 34. In the illustrated embodiment, the wear plate assembly 62 has two replaceable wear plates 64, one for each augers 30 in the feed supply feed supply system 24. Desirably, the wear plates 64 can be removed and replaced without having to open the unloader body 34 by unfastening the side panels 40 from the front panel 36 and the rear panel 38 or remove the auger(s) 30.

Figure 5:
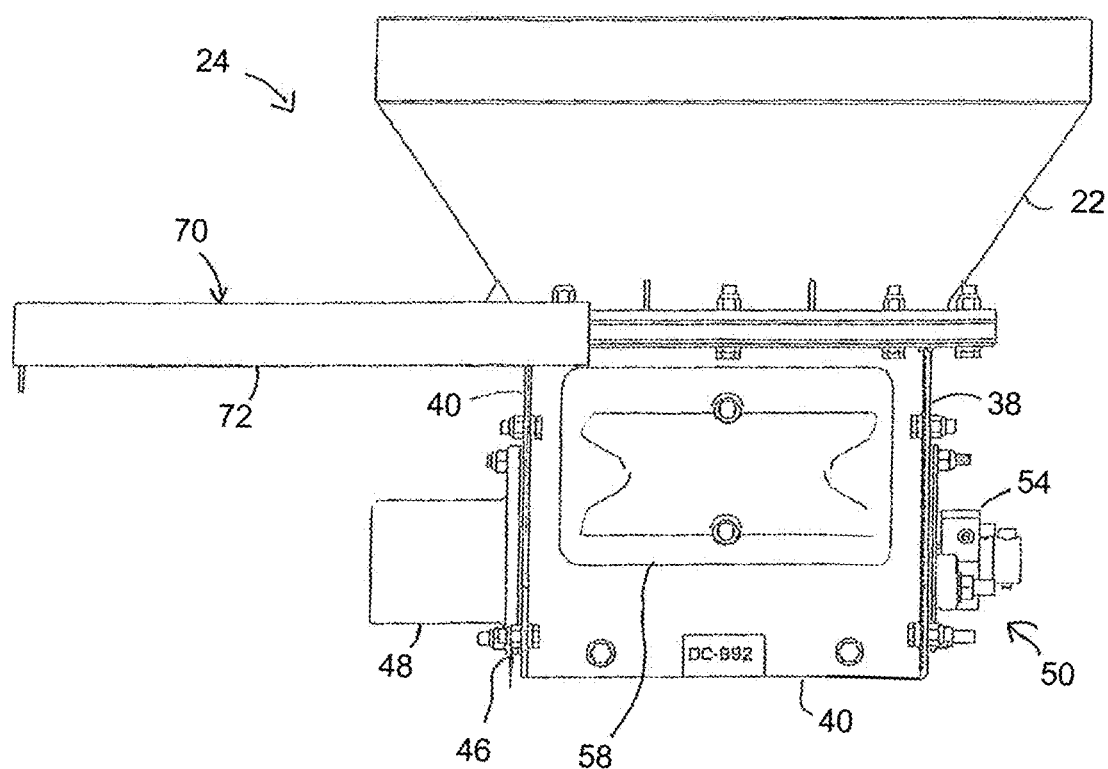
FIG. 5 is a side view of the boot unloader of FIG. 2.

As best seen in FIG. 5, the boot unloader 32 has a sliding feed door assembly 70. In FIG. 5, the feed door assembly 70 has a feed door 72 shown in the open position, which permits feed to flow from the bulk feed bin 10 into the boot unloader 32. To stop the flow of feed, the feed door 72 can be slid horizontally into a closed position. Closing of the feed door assembly 70 allows the access door 58 to be removed without excess feed spilling from the boot unloader 32.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A bulk feed tank for use in storing and distributing feed grain, the bulk feed tank having a lower outlet section having an outlet boot through which the feed grain is directed into a feed supply system having at least one conveyor housing an auger, the feed supply system including a boot unloader coupled to an upstream end of the conveyor tube and having an upwardly opening aperture that is matingly positioned in fluid communication with a downwardly opening aperture of the outlet boot, wherein the boot unloader comprises:
    an unloader body formed of a front panel, a rear panel and opposing side panels, wherein each of the side panels is fastened to the front panel and to the rear panel such that the front panel, rear panel and side panels are joined together to form a generally rectangular receiving portion in which feed grain flows from the outlet boot;
    at least one auger mounting plate mounted to the front panel, wherein the at least one auger mounting plate has a tube interface for mating with the conveyor;
    a bearing assembly secured to the rear panel, the bearing assembly having a bearing housing and at least one end bearing that rotatably mounts the auger such that the auger passes through the receiving portion;
    an access door mounted over an opening in at least one of the opposing side panels, wherein the access door is made of a clear plastic material to permit observation into the receiving portion of the unloader body while the auger is rotating; and
    a wear plate assembly attached to an underside of the boot unloader body, wherein the wear plate assembly is fastened to the front, rear and side panels, and can be removed from the boot unloader body without unfastening the side panels from the front panel and the rear panel or removing the auger from the receiving portion.

2. The bulk feed tank of claim 1 wherein the front panel has two auger mounting plates and the feed supply feed supply system has two conveyors and two augers.

3. The bulk feed tank of claim 2 wherein two parallel feed paths extend through the boot unloader, each feed path having one of the augers terminating at a respective end bearing of the at least one end bearing.

4. The bulk feed tank of claim 3 wherein the wear plate assembly has two replaceable wear plates, one for each of the augers in the feed supply feed supply system.

* * * * *